(12) United States Patent
Nishiyama et al.

(10) Patent No.: US 7,500,774 B2
(45) Date of Patent: Mar. 10, 2009

(54) ANGULAR LIGHT GUIDE WITH FRINGED PORTION

(75) Inventors: Yoshinori Nishiyama, Miyagi-ken (JP); Ayumu Kobayashi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 11/424,476

(22) Filed: Jun. 15, 2006

(65) Prior Publication Data

US 2006/0291183 A1    Dec. 28, 2006

(30) Foreign Application Priority Data

Jun. 23, 2005    (JP)    ............................. 2005-183780

(51) Int. Cl.
*F21V 7/04*    (2006.01)

(52) U.S. Cl. ..................... 362/551; 362/511; 362/602; 362/23; 362/26; 385/146

(58) Field of Classification Search ................ 362/628, 362/602, 26, 551, 555, 610, 611, 104, 108, 362/216, 570, 23, 100, 326, 327, 331, 333, 362/334, 336, 337, 338, 88, 511, 16, 27–30, 362/615, 488; 359/247, 737, 387, 711; 385/146, 385/901; 396/267

See application file for complete search history.

(56) References Cited

U.S. PATENT DOCUMENTS

| | | | | | |
|---|---|---|---|---|---|
| 2,831,453 | A | * | 4/1958 | Hardesty | 116/288 |
| 3,043,947 | A | * | 7/1962 | Albinger, Jr. | 362/634 |
| 4,215,647 | A | * | 8/1980 | Fukasawa | 116/286 |
| 5,093,764 | A | * | 3/1992 | Hasegawa et al. | 362/29 |
| 6,452,872 | B1 | * | 9/2002 | Teijido et al. | 368/67 |
| 2004/0066659 | A1 | * | 4/2004 | Mezei et al. | 362/555 |
| 2004/0207993 | A1 | * | 10/2004 | Aynie et al. | 362/23 |
| 2005/0024744 | A1 | * | 2/2005 | Falicoff et al. | 359/737 |

FOREIGN PATENT DOCUMENTS

| | | | |
|---|---|---|---|
| JP | 2004-227855 | | 8/2004 |
| JP | 2004288585 | A * | 10/2004 |

OTHER PUBLICATIONS

English Translation of Japanese Publication JP 2004288585 A.*

* cited by examiner

*Primary Examiner*—Jong-Suk (James) Lee
*Assistant Examiner*—Kevin J. Spinella
(74) *Attorney, Agent, or Firm*—Brinks Hofer Gilson & Lione

(57) ABSTRACT

An annular light guide is provided. The annular light guide is made of optically transparent material, and is provided with an annular body that is an integrated combination of a light inlet and a light outlet. A light source is disposed in a cavity formed in the light inlet. Illumination light is emitted from the front surface 16c of the light outlet.

7 Claims, 5 Drawing Sheets

ANGULAR LIGHT GUIDE WITH FRINGED PORTION

This application claims the benefit of the Japanese Patent Application No. 2005-183780 filed on Jun. 23, 2005, which is hereby incorporated by reference.

BACKGROUND

1. Field

An annular light guide is provided. The annular light guide is disposed in the back of a face plate or the like of rotary operation type electrical components. The electrical components have an illumination area along the circumferential direction and is used for illuminating the illumination area while guiding light from a light source.

2. Related Art

Conventionally, rotary operation type electrical components e are used in in-car air conditioner systems, in-car audio systems and the like. These systems use an illumination system adopted so that rotational position of a rotary knob is rotated by a passenger and is visible even in a dark place. In the illumination system, an annular thin face plate with an indicator is provided along the circumferential direction and is disposed around a rotary knob. In the back of the face plate there is an annular light guide. In this configuration, light from a light source such as a lamp illuminates the indicator of the face plate through the annular light guide (e.g., see JP-A-2004-227855).

FIG. 5 is a sectional view showing a conventional illumination system applied on a rotary operation type electrical component. FIG. 6 is a plan view showing the illumination system. A rotary operation type electrical component 1 shown in FIGS. 5 and 6 is provided with the following: a rotary knob 2 which is rotated by a passenger, a rotary encoder (here, only the rotary shaft 6 is shown) which is rotationally driven in conjunction with the rotary knob, an annular thin face plate 3 disposed around the rotary knob 2, a holder 4 which secures the inner circumferential region and the outer circumferential region on the back surface of the face plate 3 by bonding, an annular light guide 5 held by the holder 4, a light source 7 such as lamp which is disposed adjacent to one side surface 5c of the annular light guide 5, and a circuit board 8 mounted with the above-mentioned rotary encoder, light source 7 and others. The face plate 3 is provided with an indicator 3a which is supposed to be an illumination area and is located along the circumferential direction. The annular light guide 5 faces the back of the indicator 3a of the face plate 3.

The annular light guide 5 is a molded product made of highly optically transparent material such as acrylic resin, and is formed such that a small diameter inner ring portion 5a and a large diameter outer ring portion 5b are connected to appropriate points in the annular light guide. The annular light guide 5 guides light, which is emitted from the light source 7 and is incident to a side surface 5c, to each of the ring portions 5a and 5b and then makes the light emit forward.

The light guide 5 has a structure such that illumination light emitted from the front of the inner ring portion 5a illuminates a position mark 2a of the rotary knob 2, and illumination light emitted from the front of the outer ring portion 5b illuminates the indicator 3a of the face plate 3. Meanwhile, another annular light guide is known which is formed in a wide toric shape without a clearance between the inner ring portion 5a and the outer ring portion 5b.

The illumination area of the rotary knob 2 is only where the position mark 2a is. Also, a flange portion 2b protrudes from the rotary knob 2 and prevents light from leaking during illumination. The face plate 3 is formed in such a manner that light-blocking coating is applied to the front surface of an optically transparent resin plate, and on the whole back surface of the resin plate there is pasted a colored, toned sheet, whereby the indicator 3a is illuminated by the annular light guide 5 with a desired color corresponding to the toned sheet.

The indicator 3a is an illumination area in which figures, letters or the like for indicating a rotary position of the rotary knob 2 are displayed along the circumferential direction. Thereby, a passenger can visually recognize the rotational position of the rotary knob 2 by visually observing what part of the indicator 3 is pointed at by the position mark 2a. The holder 4 is a resin molded product, and also serves as an upper case to be integrated with a lower case (not shown). Each of the front surfaces of a smaller diameter annular ring 4a and a larger diameter annular ring 4b of the holder 4 fixes the face plate 3 by bonding. The circuit board 8 is provided in the above-mentioned lower case. The rotary operation type electrical component 1 is constructed to be electrically connected to an external circuit by way of the circuit board 8 and a connecter unit (not shown) provided in the lower case.

The rotary operation type electrical component 1 thus constructed is embedded in a round opening 11 formed in a front panel 10 in a car interior in such a state that the indicator 3a of the face plate 3 and the rotary knob 2 are exposed, and is set such that the rotary knob 2 protrudes forward from the opening 11. When a passenger rotates the rotary knob 2, he can check the rotational position by visually observing the relative position between the position mark 2a and the indicator 3a. Moreover, even in a dark place at night or the like, the position mark 2a and the indicator 3a can be viewed at ease due to illumination light emitted from the back side, so that a passenger has no difficulty in rotating the rotary knob 2.

Japanese Patent Application Publication No. 2004-227855 (page 2-3, FIG. 6) is an example of related art.

The conventional known annular light guide 5 described above is one that makes light from the light source 7 such as lamp enter the one side surface 5c and then guides the light to a forward illumination area (the position mark 2a and the indicator 3a). Therefore, light from the light source 7 which is not incident to the side surface 5c can not be utilized, so that there has been a problem that illumination efficiency is poor. In other words, since light from the light source 7 is emitted in all directions, light which derives from the light source 7 and is emitted in directions where the annular light guide 5 is not present (e.g., light emitted in the right direction in FIG. 5) all diffuses in vain. Further, all light incident on the one side surface 5c of the annular light guide 5 can not be utilized as illumination light, and light leaks from the annular light guide 5, that is, some light is emitted from the external wall and the like of the annular light guide 5 in undesired directions. As the result, only part of light from the light source 7 can be used as illumination light for the illumination area, thus causing a lack of brightness and higher power consumption of the light source 7.

SUMMARY OF THE INVENTION

The annular light guide is a molded product made of optically transparent material. The annular light guide includes a light inlet that has a cavity in which a light source is to be disposed and a toric light outlet that is continuous to one side of the light inlet. Moreover, the annular light guide is constructed such that the front surface of the light outlet faces the back of illumination area, and light traveling from the light source to the other side of the light inlet is reflected at said other side of the light inlet.

A light source is disposed in a cavity of a light inlet, so that light emitted from the light source in all directions can always enter the light inlet. Therefore, not only can light emitted from a light source in a direction where a light outlet is present be utilized, but also light emitted in a direction where the light outlet is not present can be utilized as illumination light by means of reflection or refraction in the light inlet, so that it is possible to substantially improve the light efficiency.

It is preferable that the cavity in which a light source is placed has a through-hole passing through a light inlet in the through-thickness direction because heat generated by a light source such as lamp can be efficiently released, thereby preventing the heat in the cavity from rising excessively. Since the amount of light emitted from a lamp in the zenith direction is small compared with the amount of light emitted from the lamp in the circumferential direction, the amount of incident light from a light source to a light inlet is not influenced even if a cavity opens in the zenith direction of a lamp.

In addition, if collective lenses that have a convex lens shape and refract light from the light source to guide the light to the light outlet are formed in part of the inner wall surface of the light inlet in which the inner wall demarcates the cavity, much of light incident from the light source to the collective lenses can be utilized as illumination light, so that it is possible to improve the illumination efficiency further.

If outward projected fringes are formed on an outer wall surface of the other side of a light inlet (i.e., the opposite side to a light outlet side) so as to extend in the through-thickness direction, light emitted from a light source in a direction where the light outlet is not present can be easily utilized as illumination light, so that it is possible to improve the illumination efficiency further. In this case, if the outward projected fringes are formed such that one part of surface closer to a symmetry line passing through the center of the light inlet and the light outlet is broader than the other part of surface farther from the symmetry line, the amount of light that turns back in a direction of the light source is reduced, and also the amount of light that travels to the light outlet is increased, so that it is possible to improve the illumination efficiency further.

If inward projected fringes are formed in a region facing the other side (the opposite side to the light outlet side) on an inner wall surface of the light inlet demarcating a cavity so as to extend in the through-thickness direction such that light from the light source is refracted by the inward projected fringes to travel in a predetermined direction of said other side, it is possible to refract light incident from the light source to the inward projected fringes in undesired directions where it is difficult to guide light to the light outlet, to thereby change the direction of the light. Therefore, it is possible to improve the illumination efficiency further.

The annular light guide is constructed such that a light source is disposed in a cavity of a light inlet, so that it is possible to utilize, as illumination light, light emitted from the light source in a direction where the light outlet is not present without leaking from the external wall surface of the light inlet. Therefore, it is possible to efficiently utilize light from the light source and substantially improve the illumination efficiency.

DESCRIPTION OF THE PREFERRED EMBODIMENT

Figure 1:
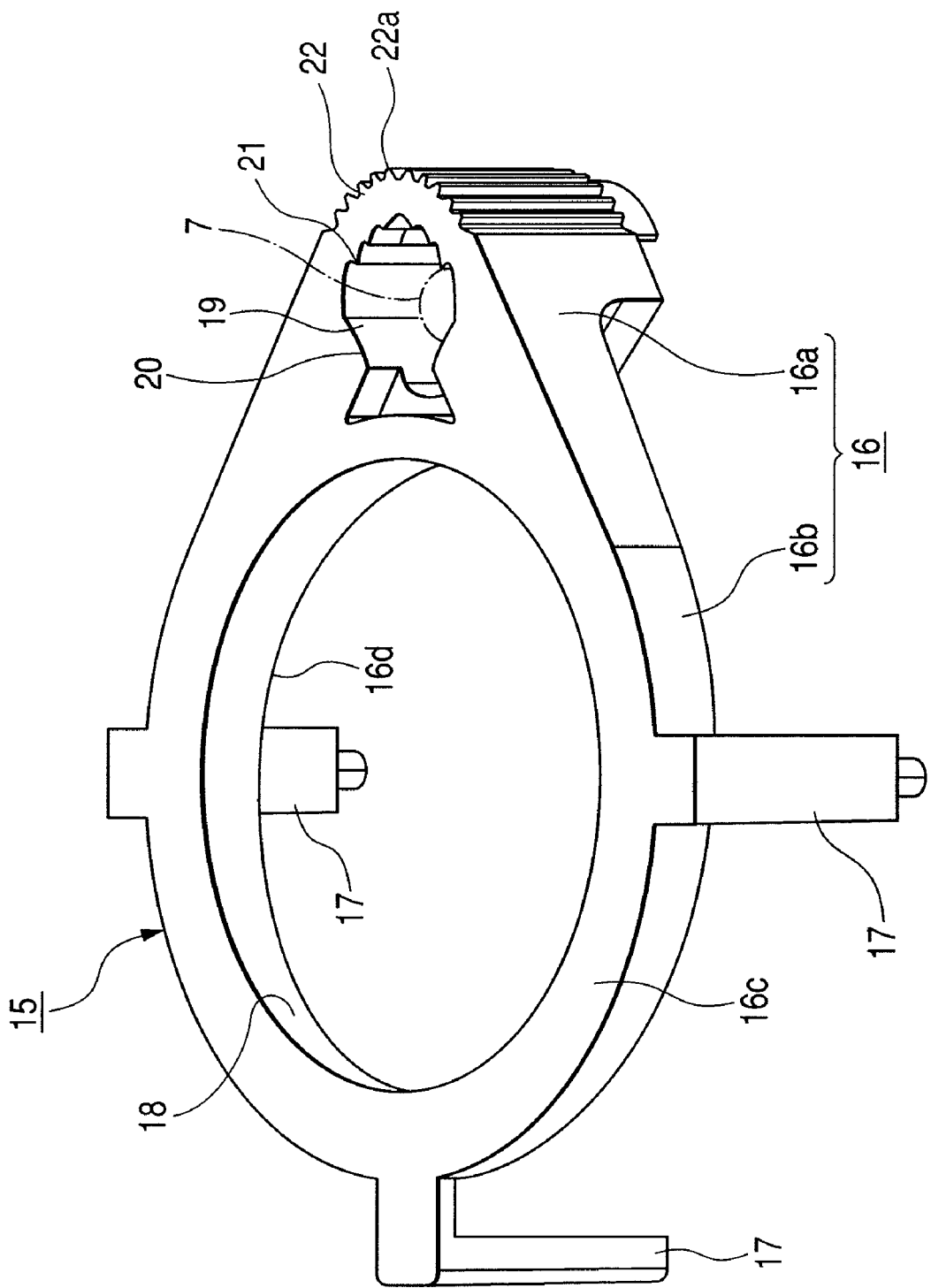
FIG. 1 is a perspective view showing an annular light guide.
Figure 2:
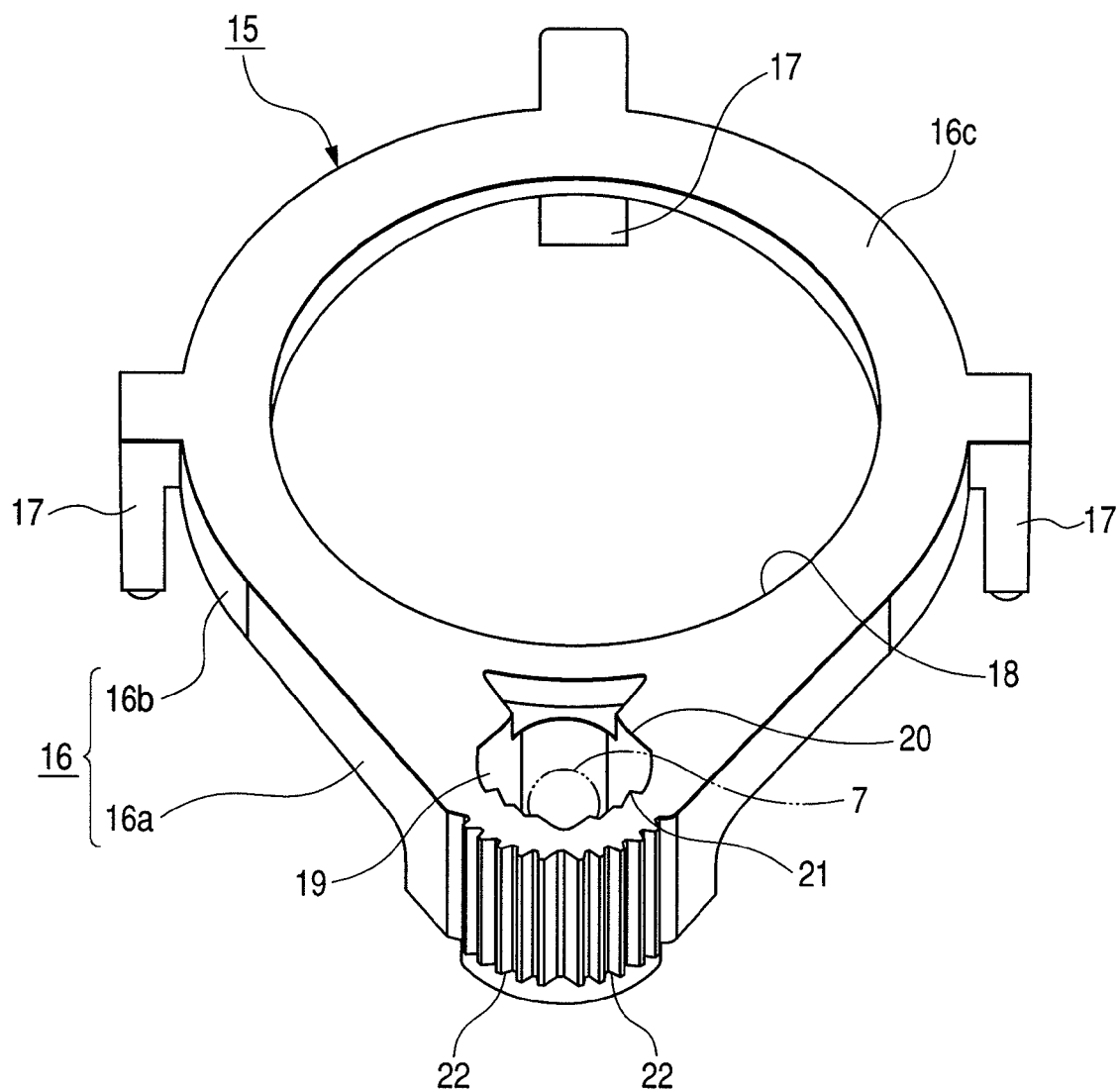
FIG. 2 is a perspective view showing the annular light guide viewed from another direction.
Figure 3:
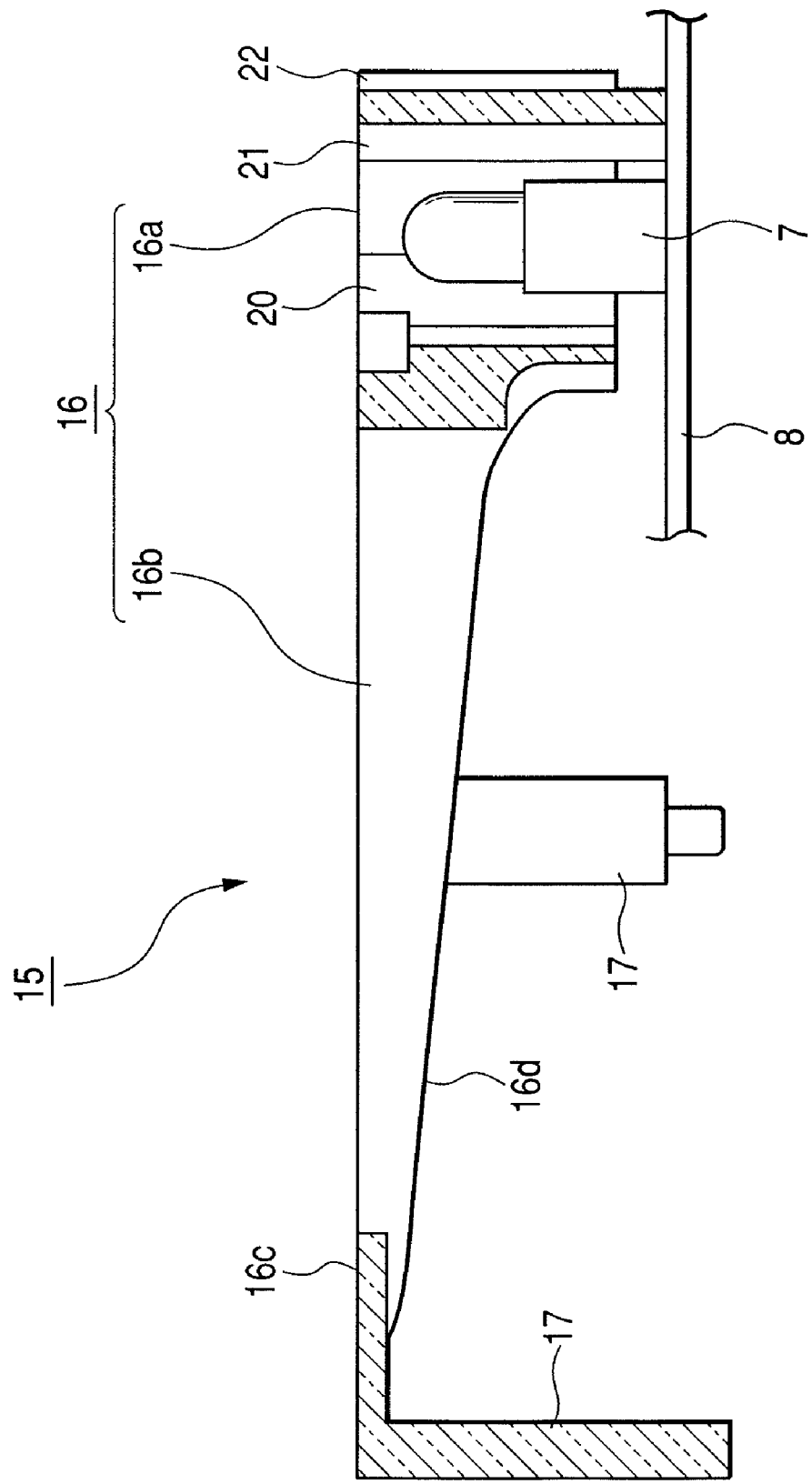
FIG. 3 is a sectional view of the annular light guide.
Figure 4:
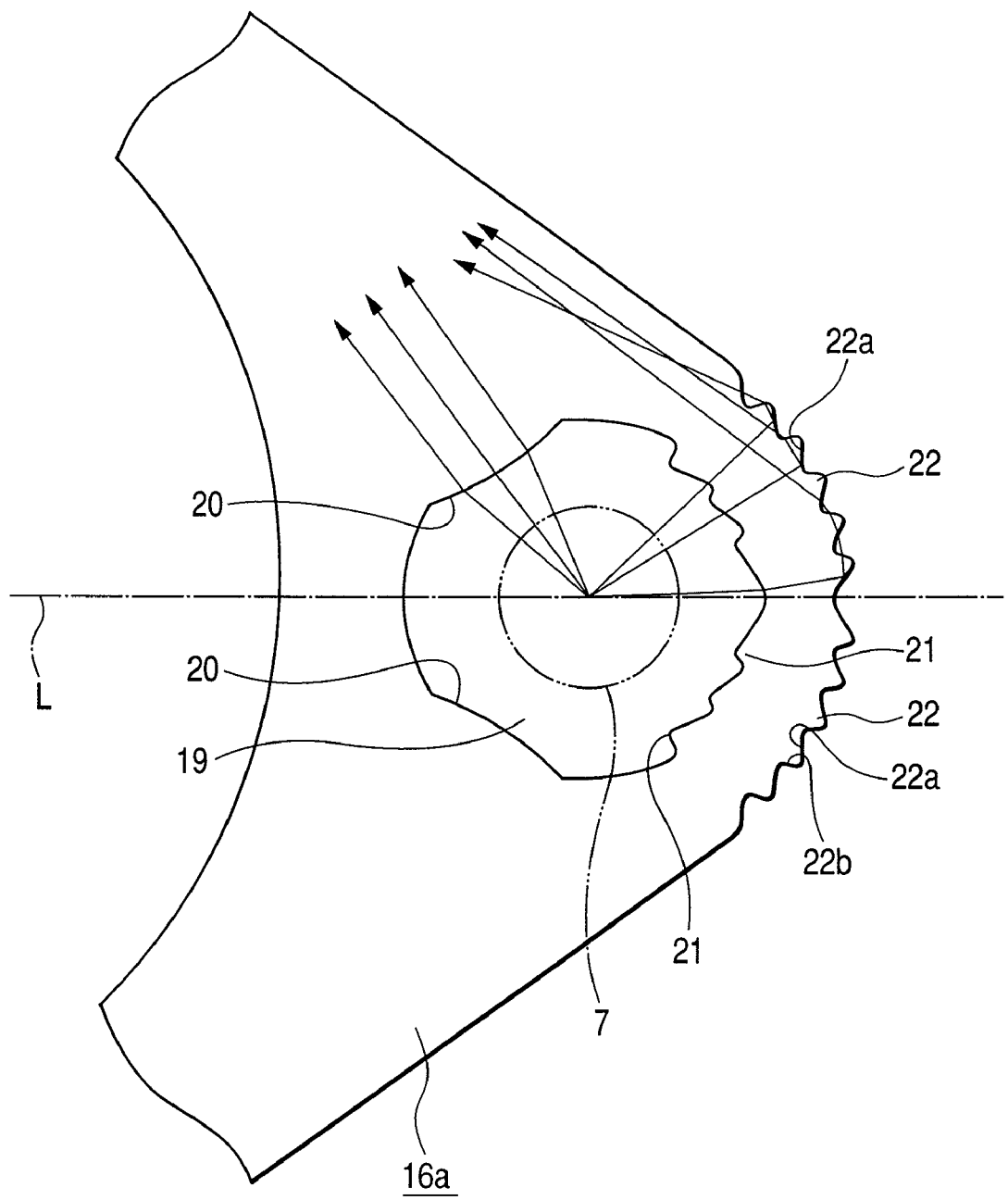
FIG. 4 is a plan view showing a primary part of a light inlet of the annular light guide.
Figure 5:
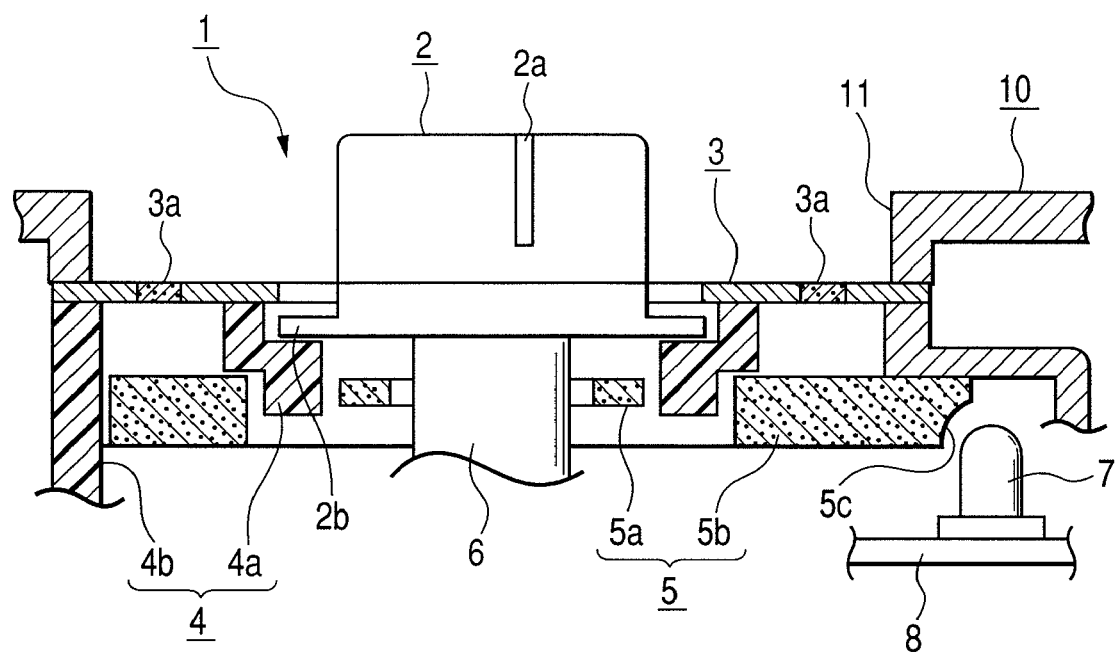
FIG. 5 is a sectional view showing a conventional illumination system.
Figure 6:
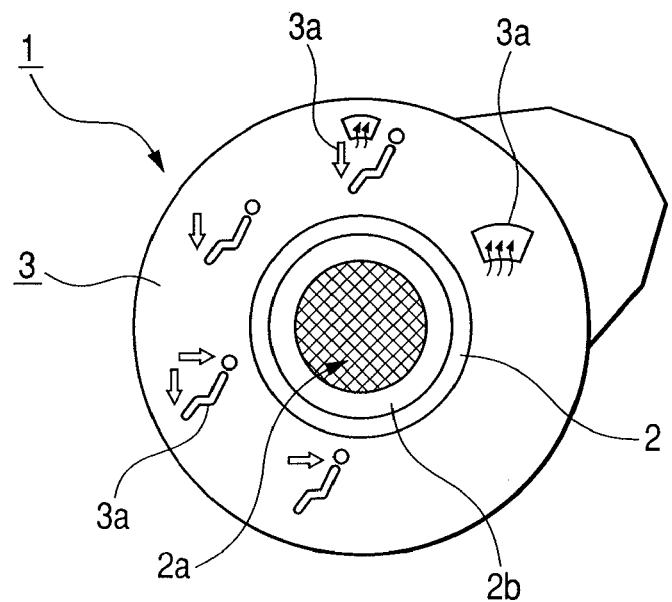
FIG. 6 is a plan view showing the illumination system.

Hereinafter, embodiments will be described with reference to the attached drawings. FIG. 1 is a perspective view showing an annular light guide. FIG. 2 is a perspective view showing the annular light guide viewed from another direction. FIG. 3 is a sectional view of the annular light guide. FIG. 4 is a plan view showing a primary part of a light inlet of the annular light guide.

The annular light guide 15 shown in these figures is a molded product made of highly optically transparent material such as acrylic resin, and is formed such that L-shaped mounting legs protrude at plural places of an annular body 16 which is an integrated combination of a light inlet 16a and a light outlet 16b. A shaft inserting hole 18 is formed in the annular body 16, and the toric part around the shaft inserting hole 18 corresponds to the light outlet 16b, and wide and thick part swelling out laterally from the light outlet 16b corresponds the light inlet 16a. In other words, the light outlet 16b is formed to be continuous with a side portion of the light inlet 16a, and the light source (lamp) 7 on the circuit board 8 is disposed in the cavity 19 formed in the light inlet 16a, whereby illumination light is emitted from the front surface 16c of the light outlet 16b.

Next, the light inlet 16a of the annular light guide 15 will be described in detail. The cavity 19 is a through-hole passing through the light inlet 16a in the through-thickness direction. The cavity 19 opens in the zenith direction of the light source 7. The collective lenses 20 having a convex lens shape are formed in the light outlet 16b side of the inner wall surface of the light inlet 16a demarcating the cavity 19. These collective lenses are located between the light source 7 and the light outlet 16b, and the shape of the lenses 20 are designed such that light from the light source 7 is refracted upon entering the collective lenses 20 and then goes toward the light outlet 16b. In the inner wall surface of the light inlet 16a, inward projected fringes 21 extending along the though-thickness direction of the light inlet 16a are formed in a region of the opposite side (hereinafter referred to as anti light outlet side) to the side where the light outlet 16b is present. These inward projected fringes 21 are for refracting light from the light source 7 to guide the light in a predetermined direction of the anti light outlet side. In addition, on the external wall surface in the anti-light outlet side of the light inlet 16a there are formed outward projected fringes 22 extending along the through-thickness direction, similarly to the inward projected fringes 21. These outward projected fringes 22 are for bouncing light from the light source 7 off the inner surface 22a to guide the light to the light outlet 16b.

In FIG. 4, paths of light emitted from the light source 7 are indicated by arrows, and beams of light incident from the light source 7 to the collective lenses 20 travel to the light outlet 16b in a form of almost parallel beams of light. On the other hand, light emitted from the light source 7 to the anti light outlet side is refracted in passing through the inward projected fringes 21, thereby changing its paths to directions away from the symmetry line L passing through the center of the light inlet and the light outlet of the annular light guide 15 and then reaching the outward projected fringes 22. Accordingly, the amount of light which is emitted from the light source 7, then passes through the inward projected fringes 21 and reaches the outward projected fringes 22 near to the symmetry line L is decreased. This configuration is based on consideration that it is not easy in the vicinity of the symmetry line L to guide light, reflected on the inner surface of the outward projected fringes 22, to the light outlet 16b. By this configuration, light incident from the light source 7 through the outward projected fringes 22 near to the symmetry line L to the inward projected fringes 21 is refracted by the inward projected fringes 21, and the paths of the light is changed to directions different from undesired directions.

When light which has been emitted from the light source 7 and has passed through the inward projected fringes 21 reaches the outward projected fringes 22, the light is reflected on the inner surface 22a in the side of the symmetry line L of the outward projected fringes 22 and then goes to the light outlet 16b as indicated by arrows in FIG. 4. Each of the outward projected fringes 22 which are formed to be projections having approximately triangle pole shapes has a pair of inner surfaces 22a and 22b which extend in the through-thickness direction of the light inlet 16a. As shown in FIG. 4, in the annular light guide 15, the inner surface 22a is formed to be wider than the inner surface 22b in the farther side from the symmetry line L. This is because the inner surface 22a nearer to the symmetry line L obliquely faces the light source 7 and the light outlet 16b and thus is suitable as a surface for reflecting light from the light source 7 toward the light outlet 16b.

As is clear from the sectional view of FIG. 3, the light outlet 16b of the annular light guide 15 is formed so as to get thinner with distance from the light inlet 16a. That is, the light outlet 16b has a front surface 16c which is a plane surface and an inclined surface 16d which is the back surface thereof. In FIG. 3, light from the light source 7 which enters from the right into the light outlet 16d is reflected upon reaching the inclined surface 16d and then goes upward to the left in the light outlet. Accordingly, light reflected on the inclined surface 16d can more easily reach where it is farther from the light outlet 16a in the light outlet 16b, so that the brightness of illumination light emitted from the toric front surface 16c of the light outlet 16b can be set to be substantially uniform all over the circumference. Here, if the inclined surface 16d is serrated, the effect of restraining uneven brightness is improved further.

In the above-described annular light guide 15, the light outlet 16b is disposed in the back side of a face plate (not shown) of a rotary operation type electric device, and the light source 7 on the circuit board 8 is embedded in such a state that the light source is placed in the cavity 19. Therefore, it is possible to make illumination light emitted from the front surface 16c of the light outlet 16b illuminate an indicator which is an illumination area of the face plate. As described in the example of related art, the face plate is located around a rotary knob (not shown) the rotational position of the rotary knob can be recognized by visually observing the relative position between the indicator provided along the circumferential direction of the face plate and the position mark provided in the rotary knob. Also, a rotary shaft (not shown) equipped with the rotary knob is loosely inserted into the shaft inserting hole 18 of the annular light guide 15, and the rotary shaft is rotated by means of the rotary knob, whereby a rotary encoder (not shown) on the circuit board 8 is rotatingly driven. Meanwhile, the position mark which is an illumination area of the rotary knob can be illuminated by light leaking from the inner circumferential surface of the light outlet 16b.

As described above, in the annular light guide 15 according to the present embodiment, the light source 7 is disposed in the cavity 19 of the light inlet 16a, so that light emitted from the light source 7 in all directions can always enter the light inlet 16a. Therefore, not only can light emitted from the light source 7 in directions where the light outlet 16b is present be utilized, but also light emitted in directions where the light outlet 16b is not present can be utilized as illumination light by means of reflection or refraction in the light inlet 16a, so that it is possible to efficiently utilize light from the light source 7. In addition, the collective lenses 20, the inward projected fringes 21, the outward projected fringes 22 and others are formed in the light inlet 16a of the annular light guide 15, so that extremely favorable illumination efficiency can be obtained, the lack of brightness for the illumination area can be solved, and the power consumption of the light source 7 can be also reduced.

In other words, if the collective lenses 20 that have a convex lens shape and refract light from the light source 7 to guide the light to the light outlet 16b are formed in part of the inner wall surface of the light inlet 16a in which the inner wall demarcates the cavity 19, much of light incident from the light source 7 to the collective lenses 20 can be utilized as illumination light. In addition, if the inward projected fringes 21 are formed in a region in the anti light outlet side on the inner wall surface of the light inlet 16a such that paths of light emitted from the light source 7 in undesired directions are changed when the light passes through the inward projected fringes 21, light that is difficult to be guided to the light outlet 16b and thus diffuses in vein can be reduced. In addition, if the outward projected fringes 22 are formed on the external wall surface in the anti light outlet side of the light inlet 16a such that the outward projected fringes 22 bounces light from the light source 7 off the inner surface 22a thereof to guide the light to the light outlet 16b, light emitted from the light source 7 in directions where the light outlet 16b is not present can be easily utilized as illumination light.

Hereinafter, a comparison result will be described that was obtained by measuring degrees to which the amount of light traveling from the light inlet 16a to the light outlet 16b according to the annex of the collective lenses 20, the inward projection fringes 21, the outward projection fringes 22 and so on. Provided that the amount of light reaching the light outlet 16b when the light inlet 16a is not equipped with the collective lenses 20, the inward projection fringes 21 and the outward projection fringes 22 is 1.00 (base value), it was proved that the amount of light when only the collective lenses 20 are equipped is 1.80, the amount of light when only the outward projection fringes 22 are equipped is 1.47, the amount of light when the inward projection fringes 21 and the outward projection fringes 22 are equipped is 1.50, the amount of light when the collective lenses 20 and the outward projection fringes 22 are equipped is 2.32, and the amount of light when the collective lenses 20, the inward projection fringes 21 and the outward projection fringes 22 are equipped as in the present embodiment is 2.34.

Additionally, in the annular light guide 15 according to the present embodiment, the cavity 19 in which the light source 7 is placed is a through-hole passing through the light inlet 16a in the through-thickness direction, so that heat generated by the light source 7 can be efficiently released. Therefore, there is no fear that the heat in the cavity 19 might rise excessively, and damage of the circuit resulting from the heat generation of the light source 7 is prevented in advance. Meanwhile, the lamp serving as a light source emits little light in the zenith direction, so that the amount of incident light from the light source 7 to the light inlet 16a is hardly influenced even if the cavity 19 opens in the zenith direction of the light source 7.

The invention claimed is:

1. An annular light guide that is a molded product made of optically transparent material, comprising:
   a light inlet that includes a cavity defined by an inner wall surface in which a light source is disposable;
   a toric light outlet having an outer circumferential side extending in a horizontal direction that is continuous with a circumferential side in a horizontal direction of the light inlet, the toric light outlet having an inner wall surface defining a hole through the toric light outlet; and
   fringes formed in an exterior wall surface of the light inlet and extending in a vertical direction, the exterior wall surface of the light inlet being substantially parallel to the inner wall surface of the light inlet,
   wherein a front surface of the toric light outlet forms an illumination area that circumnavigates the hole through the toric light outlet, and light traveling from the light source is reflected at the fringes in a horizontal direction toward the toric light outlet for emission from the illumination area.

2. The annular light guide according to claim 1, wherein the cavity is a through-hole passing through the light inlet in the through-thickness direction.

3. The annular light guide according to claim 1, wherein collective lenses that have a convex lens shape and refract light from the light source to guide the light to the toric light outlet are formed in part of the inner wall surface of the light inlet in which the first inner wall demarcates the cavity.

4. The annular light guide according to claim 1, wherein the fringes along one part of the exterior wall surface are closer to a symmetry line passing through a center of the light inlet than fringes along a further part of the exterior wall surface, and wherein the toric light outlet is broader than the further part of the exterior wall surface farther from the symmetry line.

5. The annular light guide according to claim 1, further comprising inward projected fringes on a region of the inner wall surface of the light inlet that extend in the vertical direction.

6. The annular light guide according to claim 5 wherein light from the light source is refracted by the inward projected fringes to travel in predetermined directions.

7. The annular light guide according to claim 1, wherein the fringes have a triangle pole shape.

* * * * *

UNITED STATES PATENT AND TRADEMARK OFFICE
CERTIFICATE OF CORRECTION

PATENT NO. : 7,500,774 B2 Page 1 of 1
APPLICATION NO. : 11/424476
DATED : March 10, 2009
INVENTOR(S) : Yoshinori Nishiyama et al.

It is certified that error appears in the above-identified patent and that said Letters Patent is hereby corrected as shown below:

In column 8, claim 3, line 5, after "inlet in which the" delete "first".

Signed and Sealed this

Fourth Day of August, 2009

JOHN DOLL
*Acting Director of the United States Patent and Trademark Office*